United States Patent
Dietrich et al.

(10) Patent No.: US 6,509,387 B1
(45) Date of Patent: Jan. 21, 2003

(54) PROCESS FOR PREPARING RIGID FOAMED MATERIALS CONTAINING URETHANE GROUPS

(75) Inventors: Karl Werner Dietrich, Odenthal (DE); Norbert Eisen, Köln (DE); Gerhard Heilig, Bergisch Gladbach (DE)

(73) Assignee: Bayer Aktiengesellschaft, Leverkusan (DE)

( * ) Notice: Subject to any disclaimer, the term of this patent is extended or adjusted under 35 U.S.C. 154(b) by 0 days.

(21) Appl. No.: 09/077,914

(22) PCT Filed: Dec. 2, 1996

(86) PCT No.: PCT/EP96/05335

§ 371 (c)(1),
(2), (4) Date: Jun. 4, 1998

(87) PCT Pub. No.: WO97/21765

PCT Pub. Date: Jun. 19, 1997

(30) Foreign Application Priority Data

Dec. 13, 1995 (DE) .......................................... 195 46 461

(51) Int. Cl.⁷ ......................... C08G 18/50; C08G 18/00
(52) U.S. Cl. ........................................ 521/131; 521/167
(58) Field of Search .................................. 521/131, 167

(56) References Cited

U.S. PATENT DOCUMENTS 5,096,933 A 3/1992 Volkert ........................ 521/131
5,444,101 A 8/1995 De Vos et al. .............. 521/131

FOREIGN PATENT DOCUMENTS

WO 94/25514 * 11/1994

* cited by examiner

*Primary Examiner*—Morton Foelak
(74) *Attorney, Agent, or Firm*—Joseph C. Gil; Lyndanne M. Whalen

(57) ABSTRACT

The description relates to production of rigid foamed plastics containing urethane groups, by use of a blowing-agent mixture containing 5 to 50 parts by weight of $C_3$ and/or $C_4$ alkanes and 50 to 95 parts by weight of cyclopentane. There is also a description of use of the thus-produced rigid foamed plastics as composite components or for foam filling of cavities in refrigerator construction.

6 Claims, No Drawings

PROCESS FOR PREPARING RIGID FOAMED MATERIALS CONTAINING URETHANE GROUPS

It is known to blow polyurethane rigid foamed plastics, using low-boiling alkanes. It is advantageous to use cyclic alkanes for this purpose since, owing to their low thermal conductivity in the gaseous state, they greatly improve the thermal conductivity of the foamed plastic. The main substance used is cyclopentane. Cyclopentane, however, owing to its relatively high boiling-point (49° C.), has the disadvantage that it condenses at low temperatures, which occur normally when polyurethane rigid foamed plastic is used as an insulating material in domestic refrigerators. At these low temperatures, especially when used in refrigerators, cyclopentane does not have its full insulating effect, and also the undesired condensation of the blowing agent results in a negative pressure in the cell, which has to be compensated by increasing the rigidity of the foam or increasing the bulk density.

The object of the invention is to provide cyclopentane-containing blowing-agent mixtures which retain the good thermal insulation of cyclopentane even at low temperatures.

It has now surprisingly been found that by adding small proportions of low-boiling alkanes in the $C_3$ and $C_4$ series, the advantageous thermal conductivity of cyclopentane foam can be retained and also the pressure inside the cells can be considerably increased, especially at low temperatures. "Low temperatures" as usual means temperatures below 10° C., e.g. between −30° C. and +5° C.

An important feature of blowing-agent mixtures is that they are liquid at room temperature and the normally gaseous $C_3$ and $C_4$ components do not increase the vapour pressure of the total mixture above 1 bar. This has been found particularly in the case of mixtures of cyclopentane and n-butane and/or isobutane, so that no complications result in polyurethane processing. An admixture of low-boiling alkanes appreciably impairs the insulating effect but, at proportions of 10 to 25% by weight, the impairment is surprisingly small. Cyclopentane usually dissolves easily in most polyols used in rigid polyurethane foam. Low-boiling aliphatic alkanes have much worse solubility, so that $C_3$ and $C_4$-alkanes added to cyclopentane reduce the solubility of the blowing agent. In this case it is advantageous to use polyols started on aromatic amines; these have excellent solubility even in the case of acyclic alkanes.

The invention accordingly provides a method of producing rigid foamed plastics containing urethane and optionally containing isocyanurate groups, by reaction of polyols, polyisocyanates, blowing agents and optional foam auxiliary substances, characterised in that the blowing agent is a mixture of 5 to 50 parts by weight of $C_3$ and/or $C_4$ alkanes and 50 to 95 parts by weight of cyclopentane.

The polyols and polyisocyanates in the method according to the invention can be any per se known starting components.

The isocyanate components can e.g. be aromatic polyisocyanates such as described by W. Siefken in Justus Liebigs Annalen der Chemie, 562, pages 75 to 136, e.g. substances having the formula Q(NCO)$_n$ in which n is 2 to 4, preferably 2, and Q denotes an aliphatic hydrocarbon radical with 2 to 18, preferably 6 to 10 carbon atoms, or a cycloaliphatic hydrocarbon radical with 4 to 15, preferably 5 to 10 carbon atoms, or an aromatic hydrocarbon radical with 6 to 15, preferably 6 to 13 carbon atoms or an araliphatic hydrocarbon radical with 8 to 15, preferably 8 to 13 carbon atoms, e.g. polyisocyanates such as described in DE-OS 28 32 253, pages 10 to 11.

Particular preference as a rule is given to polyisocyanates which are easily obtainable industrially, e.g. 2,4 and 2,6-toluylene diisocyanate or any mixtures of these isomers ("TDI"), or polyphenyl polymethylene polyisocyanates produced by condensation of aniline and formaldehyde and subsequent phosgenation ("crude MDI") or polyisocyanates containing carbodiimide groups, urethane groups, allophanate groups, isocyanurate groups, urea groups or biuret groups ("modified polyisocyanates"), more particularly modified polyisocyanates derived from 2,4 or 2,6-toluylene diisocyanate or from 4,4'- and/or 2,4'-diphenyl methane diisocyanate.

The starting components for the polyol component are compounds containing at least two hydrogen atoms capable of reacting with isocyanates and having a molecular weight usually between 62 and 20000. These include compounds containing amino groups, thiol groups or carboxyl groups and also and preferably compounds containing hydroxyl groups, preferably polyethers, polyesters, polycarbonates, polylactones and polyamides, particularly compounds containing 2 to 8 hydroxyl groups, especially those having a molecular weight of 1,000 to 20,000, e.g. compounds containing at least 2, usually 2 to 8, preferably 2 to 4 hydroxyl groups as known per se in the production of polyurethanes and described e.g. in DE-OS 28 32 253, pages 11 to 18. Mixtures of various compounds of this kind can also be used according to the invention.

Optionally, known additives and auxiliary substances, such as flame retardants, catalysts and foam stabilizers, are also used.

The flame retardants are per se known flame retardants, preferably products liquid at 20° C.

The foam stabilizers are preferably polyether siloxanes, especially if soluble in water. These compounds usually have a structure in which a copolymer of ethylene oxide and propylene oxide is combined with a polydimethyl siloxane radical. Foam stabilizers of this kind are described e.g. in U.S. Pat. Nos. 2,834,748, 2,917,480 and 3,629,308. The catalysts can be those known per se in polyurethane chemistry, such as tert.-amines and/or organometallic compounds.

Use can also be made of reaction retarders, e.g. acid-reacting substances such as hydrochloric acid or organic acid halides, or cell regulators of per se known kind such as paraffins or fatty alcohols or dimethyl polysiloxanes, or pigments or dyes, or stabilizers against ageing and weathering, plasticizers, fungistatic substances and bacteriostats or fillers such as barium sulphate, kieselguhr, carbon black or whiting.

Other examples of surface-active additives and foam stabilizers optionally also used according to the invention, cell regulators, reaction retarders, stabilizers, flame-retarding substances, dyes, fillers, fungistatic substances and bacteriostats and details about use and operation of these auxiliary substances are described in Kunststoff-Handbuch, Volume VII, published by Vieweg and Höchtlen, Carl Hanser Verlag, Munich 1966, e.g. on pages 121 to 205.

In the production of foam according to the invention, foaming can also be brought about in closed moulds. The reaction mixture is placed in a mould, which can be made of metal e.g. aluminium or plastic e.g. epoxy resin. In the mould, the expandable reaction mixture foams and forms the moulded member. The foaming process in the mould can be managed so that the moulded part has a cellular surface structure. Alternatively it can be managed so that the moulded part has a compact skin and a cellular core. The procedure according to the invention in the first case is to introduce expandable reaction mixture into the mould in an amount sufficient for the resulting foamed plastic just to fill the mould. In the latter case, the amount of reaction mixture introduced into the mould is more than enough to fill the interior of the mould with foamed plastic. In the latter case, operation is by "over-charging". A method of this kind is known e.g. from U.S. Pat. Nos. 3,178,490 and 3,182,104.

The $C_3$ and/or $C_4$ alkanes used according to the invention are preferably n-butane and/or isobutane.

0.5 to 4 parts by weight of water can advantageously be used as a co-blowing agent in addition to the alkane mixture according to the invention. It is preferable to use 1.5 to 3 parts by weight of water as the co-blowing agent.

Preferably, in the production of rigid polyurethane foamed plastics according to the invention, the polyol component is a mixture of 5 to 80 parts by weight of polyol based on aromatic amines. It is particularly preferable to use 20 to 65 parts by weight of polyol based on aromatic amines.

The invention further provides blowing-agent mixtures containing 5 to 50 parts by weight of $C_3$ and/or $C_4$ alkanes, preferably n-butane and/or isobutane, and 50 to 95 parts by weight of cyclopentane.

The invention also provides use of the rigid foamed plastics produced according to the invention as an intermediate layer in composite components and for foam filling of cavities in domestic refrigerator construction.

Preferably the method according to the invention is used for foam filling of cavities in refrigerators and freezers.

Alternatively, of course, foamed plastics can be produced by slabstock production or by the per se known double conveyor-belt process.

The rigid foamed plastics obtainable according to the invention are used e.g. in building and for insulation of remote-heating pipes and containers.

The following examples are designed to illustrate the invention without limiting its scope.

EXAMPLES

Example 1
(Comparative Example)
Formulation for Rigid Polyurethane Foamed Plastic Component A

| 50 parts by wt. | O-toluylene diamine-started polyethers with propylene oxide OH number = 400 |
| 50 parts by wt. | of sugar-started polyethers with propylene oxide, OH number = 380 |
| 2 parts by wt. | of $H_2O$ |
| 2 parts by wt. | of foam stabilizer B 8423 (made by Goldschmidt) |
| 2 parts by wt. | of Desmorapid 726 b activator (made by Bayer AG) |

Component B

| 140 parts by wt. | of crude MDI (NCO content: 31.5% by wt.) |

100 parts by weight of component A were mixed with 12 parts by weight of cyclopentane and 140 parts by weight of component B in an agitator (1000 rpm) at 20° C. and compressed to 34 kg/m³ in a closed mould.

Example 2
(According to the Invention)

Formulation and processing as in Example 1, except that the blowing agent was a mixture of cyclopentane and n-butane in the molar ratio 85:15.

Example 3
(According to the Invention)

As in Example 1 and 2.

The blowing-agent mixture consisted of cyclopentane and n-butane in the molar ratio 80:20.

Example 4
(According to the Invention)

As in Examples 1 to 3.

Blowing-agent mixture of cyclopentane and i-butane in the molar ratio 90:10.

Results

The thermal conductivity and compressive strength of the foamed plastic slabs produced in Examples 1 to 3 was measured.

TABLE

| Example | Thermal conductivity (mW/mK) to DIN 52 616, 24° C. | Compressive strength (MPa) to DIN 53 421, under 10% compressive strain |
| --- | --- | --- |
| 1 | 21.1 | 0.14 |
| 2 | 21.3 | 0.17 |
| 3 | 21.5 | 0.19 |
| 4 | 21.4 | 0.18 |

As the results show, the compressive strength of rigid plastics having a given bulk density can be improved by admixtures of n-butane and i-butane.

Surprisingly there was no appreciable impairment of thermal conductivity. These blowing-agent mixtures can therefore be used for producing foamed plastics which largely retain their good insulating properties. They can be used preferably in refrigerator construction.

What is claimed is:

1. A process for the production of a rigid polyurethane foamed plastic comprising reacting
   a) from about 20 to about 65 parts by weight of an aromatic amine initiated polyol,
   b) a polyisocyanate,
   c) a blowing agent comprising
      1) from about 5 to about 50 parts by weight of a $C_3$ and/or $C_4$ alkane and
      2) from about 50 to about 95 parts by weight of cyclopentane, and
   optionally
   d) auxiliary additives.
2. The process of claim 1 in which c) 1) is n-butane.
3. The process of claim 1 in which c) 1) is isobutane.
4. The process of claim 1 in which c) further includes from about 0.5 to about 4 parts by weight of water.
5. The process of claim 1 in which c) further includes from about 1.5 to about 3 parts by weight of water.
6. A rigid polyurethane foam plastic produced by the process of claim 1.

* * * * *

(12) EX PARTE REEXAMINATION CERTIFICATE (8182nd)

United States Patent
Dietrich et al.

(10) Number: US 6,509,387 C1
(45) Certificate Issued: Apr. 26, 2011

(54) PROCESS FOR PREPARING RIGID FOAMED MATERIALS CONTAINING URETHANE GROUPS

(75) Inventors: Karl Werner Dietrich, Odenthal (DE); Norbert Eisen, Köln (DE); Gerhard Heilig, Bergisch Gladbach (DE)

(73) Assignee: Bayer Aktiengesellschaft, Leverkusen (DE)

Reexamination Request:
No. 90/008,365, Jan. 18, 2007

Reexamination Certificate for:
Patent No.: 6,509,387
Issued: Jan. 21, 2003
Appl. No.: 09/077,914
Filed: Jun. 4, 1998

(22) PCT Filed: Dec. 2, 1996

(86) PCT No.: PCT/EP96/05335
§ 371 (c)(1),
(2), (4) Date: Jun. 4, 1998

(87) PCT Pub. No.: WO97/21765
PCT Pub. Date: Jun. 19, 1997

(51) Int. Cl.
*C08G 18/00* (2006.01)
*C08G 18/032* (2006.01)
*C08G 18/048* (2006.01)
*G08J 9/00* (2006.01)
*G08J 9/014* (2006.01)

(52) U.S. Cl. .................................. 521/131; 521/167
(58) Field of Classification Search .................. None
See application file for complete search history.

(56) References Cited

FOREIGN PATENT DOCUMENTS

JP        7-97470        4/1995

*Primary Examiner*—Jerry D. Johnson

(57) ABSTRACT

The description relates to production of rigid foamed plastics containing urethane groups, by use of a blowing-agent mixture containing 5 to 50 parts by weight of $C_3$ and/or $C_4$ alkanes and 50 to 95 parts by weight of cyclopentane. There is also a description of use of the thus-produced rigid foamed plastics as composite components or for foam filling of cavities in refrigerator construction.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *